(12) United States Patent
Bharghavan et al.

(10) Patent No.: US 8,787,309 B1
(45) Date of Patent: Jul. 22, 2014

(54) SEAMLESS MOBILITY IN WIRELESS NETWORKS

(75) Inventors: Vaduvur Bharghavan, Morgan Hill, CA (US); Sung-Wook Han, Sunnyvale, CA (US); Joseph Epstein, Fremont, CA (US); Berend Dunsbergen, San Jose, CA (US); Saravanan Balasubramanian, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 0 days.

(21) Appl. No.: 12/913,584

(22) Filed: Oct. 27, 2010

Related U.S. Application Data (63) Continuation of application No. 11/715,287, filed on Mar. 7, 2007, now Pat. No. 7,826,426, which is a continuation of application No. 11/298,864, filed on Dec. 9, 2005, now abandoned, which is a continuation-in-part of application No. 11/294,673, filed on Dec. 5, 2005.

(51) Int. Cl.
*H04W 4/00* (2009.01)

(52) U.S. Cl.
USPC .......................................... 370/331; 455/442

(58) Field of Classification Search
USPC .................. 370/238, 331–334, 338, 328; 455/436–444
See application file for complete search history.

(56) References Cited

U.S. PATENT DOCUMENTS

| | | | |
|---|---|---|---|
| 3,956,749 A | 5/1976 | Magorian | |
| 5,038,151 A | 8/1991 | Kaminski | |
| 5,125,108 A | 6/1992 | Talwar | |
| 5,177,788 A | 1/1993 | Schanning et al. | |
| 5,337,397 A | 8/1994 | Lebby et al. | |
| 5,519,706 A | 5/1996 | Bantz et al. | |
| 5,884,272 A | 3/1999 | Walker et al. | |
| 5,966,094 A | 10/1999 | Ward et al. | |
| 6,658,047 B1 | 12/2003 | Komulainen et al. | |

(Continued)

FOREIGN PATENT DOCUMENTS

| | | |
|---|---|---|
| JP | 2005311580 | 11/2005 |
| JP | 2006229972 | 8/2006 |

OTHER PUBLICATIONS

Amir. "Fast handoff for seamless wireless mesh networks." MobiSys '06, Jun. 19-22, 2006, pp. 83-95, ACM, Uppsala, Sweden.

(Continued)

*Primary Examiner* — George Eng
*Assistant Examiner* — Marcus Hammonds
(74) *Attorney, Agent, or Firm* — Law Office of Dorian Cartwright (57) ABSTRACT

AP's associated with a communication network and any wireless devices desiring contact, operated according to a protocol in which each wireless device selects AP's with which to communicate. A system coordinator causes the AP's to operate so as to guide each wireless device to an AP selected by the system coordinator. This has the effect that, notwithstanding that the protocol involves having the wireless device make the selection of AP, functionally, the AP's make the selection for it. In a $1^{st}$ technique, multiple AP's share an identifier, with the system coordinator directing one particular AP to respond to the wireless device, thus appearing to wireless devices as a "personal cell". In a $2^{nd}$ technique, AP's each maintain identifiers substantially unique to each wireless device, with the system coordinator directing only one particular AP to maintain any particular wireless device's identifier, thus appearing to wireless devices as a "personal AP".

19 Claims, 7 Drawing Sheets

(56) References Cited

U.S. PATENT DOCUMENTS

| | | | |
|---|---|---|---|
| 6,728,603 B2 | 4/2004 | Pruzan et al. | |
| 6,760,318 B1 | 7/2004 | Bims | |
| 6,788,658 B1* | 9/2004 | Bims | 370/328 |
| 6,839,038 B2 | 1/2005 | Weinstein | |
| 6,877,043 B2 | 4/2005 | Mallory et al. | |
| 6,894,649 B2 | 5/2005 | Ostervall | |
| 6,933,909 B2 | 8/2005 | Theobold | |
| 6,950,629 B2 | 9/2005 | Nagy | |
| 6,954,177 B2 | 10/2005 | Channabassappa et al. | |
| 6,978,158 B2 | 12/2005 | Ghavami | |
| 6,999,802 B2 | 2/2006 | Kim | |
| 7,171,215 B2 | 1/2007 | Khouaja et al. | |
| 7,194,008 B2 | 3/2007 | Chu et al. | |
| 7,197,308 B2 | 3/2007 | Singhal et al. | |
| 7,277,728 B1 | 10/2007 | Kauhanen | |
| 7,319,685 B2 | 1/2008 | Kim et al. | |
| 7,333,455 B1 | 2/2008 | Bolt et al. | |
| 7,359,362 B2 | 4/2008 | King et al. | |
| 7,400,604 B2 | 7/2008 | Lee et al. | |
| 7,403,506 B2 | 7/2008 | Lee et al. | |
| 7,406,319 B2 | 7/2008 | Kostic et al. | |
| 7,420,942 B2 | 9/2008 | Wang | |
| 7,426,388 B1 | 9/2008 | Wright et al. | |
| 7,430,397 B2 | 9/2008 | Suda et al. | |
| 7,433,722 B2 | 10/2008 | Sakamoto et al. | |
| 7,466,981 B1 | 12/2008 | Abdelhamid et al. | |
| 7,515,909 B2 | 4/2009 | Jain et al. | |
| 7,555,287 B1 | 6/2009 | Heinonen et al. | |
| 7,630,402 B2 | 12/2009 | Un et al. | |
| 7,693,513 B2* | 4/2010 | Chou | 455/418 |
| 7,826,426 B1 | 11/2010 | Bharghavan et al. | |
| 7,843,910 B2 | 11/2010 | Loughran et al. | |
| 8,027,637 B1* | 9/2011 | Bims | 455/16 |
| 8,090,374 B2 | 1/2012 | Rezvani et al. | |
| 8,472,359 B2 | 6/2013 | Bharghavan et al. | |
| 2002/0022483 A1* | 2/2002 | Thompson et al. | 455/439 |
| 2002/0060995 A1 | 5/2002 | Cervello et al. | |
| 2002/0086640 A1 | 7/2002 | Belcher et al. | |
| 2002/0112008 A1 | 8/2002 | Christenson et al. | |
| 2002/0181629 A1 | 12/2002 | Shibata | |
| 2003/0162546 A1 | 8/2003 | Jordan | |
| 2003/0198305 A1 | 10/2003 | Taylor et al. | |
| 2003/0206532 A1* | 11/2003 | Shpak | 370/322 |
| 2003/0206535 A1 | 11/2003 | Shpak | |
| 2003/0207697 A1* | 11/2003 | Shpak | 455/524 |
| 2003/0207698 A1* | 11/2003 | Shpak | 455/525 |
| 2003/0207699 A1 | 11/2003 | Shpak | |
| 2003/0236103 A1 | 12/2003 | Tamaki et al. | |
| 2004/0051668 A1 | 3/2004 | Chang | |
| 2004/0063455 A1* | 4/2004 | Eran et al. | 455/525 |
| 2004/0121770 A1* | 6/2004 | Tigerstedt et al. | 455/436 |
| 2004/0141617 A1* | 7/2004 | Volpano | 380/270 |
| 2004/0156399 A1* | 8/2004 | Eran | 370/913 |
| 2004/0183726 A1 | 9/2004 | Theobald | |
| 2004/0185904 A1 | 9/2004 | Yamakita | |
| 2004/0235453 A1 | 11/2004 | Chen et al. | |
| 2005/0054370 A1* | 3/2005 | Shpak | 455/525 |
| 2005/0111405 A1 | 5/2005 | Kanterakis | |
| 2005/0122919 A1* | 6/2005 | Touag | 370/310 |
| 2005/0135321 A1 | 6/2005 | Sharony | |
| 2005/0152314 A1 | 7/2005 | Sun et al. | |
| 2005/0153713 A1 | 7/2005 | Sharony | |
| 2005/0156794 A1 | 7/2005 | Theobald et al. | |
| 2005/0156799 A1 | 7/2005 | Theobald | |
| 2005/0195110 A1 | 9/2005 | Lin et al. | |
| 2005/0219143 A1 | 10/2005 | Schadler et al. | |
| 2005/0220048 A1 | 10/2005 | Lee et al. | |
| 2006/0002331 A1* | 1/2006 | Bhagwat et al. | 370/328 |
| 2006/0025127 A1 | 2/2006 | Cromer et al. | |
| 2006/0049987 A1 | 3/2006 | Herrick | |
| 2006/0111112 A1 | 5/2006 | Maveddat | |
| 2006/0215691 A1 | 9/2006 | Kobayashi et al. | |
| 2006/0221993 A1 | 10/2006 | Liao et al. | |
| 2007/0014267 A1* | 1/2007 | Lam et al. | 370/338 |
| 2007/0117514 A1 | 5/2007 | Gainey et al. | |
| 2007/0165610 A1 | 7/2007 | Tseng et al. | |
| 2007/0213071 A1 | 9/2007 | Hwang | |
| 2008/0014956 A1 | 1/2008 | Balasubramanian | |
| 2008/0102835 A1 | 5/2008 | Zhao et al. | |
| 2008/0112373 A1* | 5/2008 | Shpak | 370/338 |
| 2008/0153497 A1 | 6/2008 | Kalhan | |
| 2008/0165866 A1 | 7/2008 | Teo et al. | |
| 2008/0212535 A1 | 9/2008 | Karaoguz et al. | |
| 2008/0242305 A1 | 10/2008 | Kahlert et al. | |
| 2008/0287130 A1 | 11/2008 | Laroia et al. | |
| 2009/0022127 A1 | 1/2009 | Traynor et al. | |
| 2009/0023434 A1 | 1/2009 | Trainor et al. | |
| 2009/0061873 A1 | 3/2009 | Bao et al. | |
| 2009/0061879 A9 | 3/2009 | Gallagher et al. | |
| 2009/0111472 A1 | 4/2009 | Promenzio | |
| 2010/0080151 A1 | 4/2010 | Proctor et al. | |
| 2013/0148609 A1 | 6/2013 | Ram et al. | |

OTHER PUBLICATIONS

Business Wire. "Meru Networks Delivers Industry's Only Zero-Loss Mobility Across WLAN Access Points and IP Subnets." Jun. 21, 2004, pp. 1-2.

Chen et al. "A seamless handoff mechanism for DHCP-Based IEEE 802.11 WLANS." IEEE Communications Letters, vol. 1, No. 8, Aug. 2007, pp. 665-667.

Cheung et al. "Network configurations for seamless support of CDMA soft handoffs between cell clusters." IEEE Journal on Selected Areas in Communications, vol. 15, No. 7, Sep. 1997, pp. 1276-1288.

Chou et al. "Intelligent Agent Over WLAN with Seamless Handover and Load Balancing." 2006 International Conference on Communication Technology, Nov. 27-30, 2006, pp. 1-7, IEEE. (Abstract).

Chui et al. "An Access point coordination system for improved VoIP/WLAN handover performance." IEEE 2006, pp. 501-505.

Fan et al. "Managing heterogeneous access networks." 32nd IEEE Conference on Local Computer Networks, IEEE 2007, pp. 651-658.

Finneran. "Can WLAN Switches Support Voice? Today's Controllers Offer Key Security and QoS Capabilities, But As Always, the Devil's in the Details." Business Communications Review, Oct. 2006, pp. 42-47.

Huang et al. "Incorporating AP selection and call admission control for seamless handoff procedure." Proceedings of the International Conference on Computer and Communication Engineering 2008, pp. 823-826, 2008.

Huang et al. "SAP: Seamless authentication protocol for vertical handoff in heterogeneous wireless networks." Third International Conference on Quality of Service in Heterogeneous Wired/Wireless Networks, Aug. 7-9, 2006, ACM, Waterloo, ON, Canada, pp. 1-10.

Hur et al. "A Distributed-Request-Based Diffserv CAC for Seamless Fast-Handoff in Mobile Internet." J. Sole-Pareta et al. (Eds.): Q of IS 2004: International Workshop on Quality of Future Internet Services, LNCS 3266, 2004, pp. 184-193.

Jang et al. "Mobility Support Algorithm Based on Wireless 802.11b LAN for Fast Handover." 5th International Conference, PDCAT 2004, Dec. 8-10, 2004, pp. 715-718, Springer Verlag. (Abstract).

Jinfang et al. "A Seamless Handoff Scheme for Mobile IP." 2006 IEEE 63rd Vehicular Technology Conference, VTC 2006-Spring, May 7-Jul. 10, 2006, pp. 927-931, IEEE. (Abstract).

Kist. "Instant handoffs for wireless infrastructure meshed networks," Proceedings of the 2008 Australasian Telecommunication Networks and Applications Conference, pp. 288-293, 2008.

Liao et al. "Practical schemes for smooth MAC layer handoff in 802.11 wireless networks." Proceedings of the 2006 International Symposium on a World of Wireless, Mobile and Multimedia Networks, IEEE, pp. 1-10.

Lv. "Intelligent seamless vertical handoff algorithm for the next generation wireless networks." Mobilware '08, Feb. 12-15, 2008, Innsbruck, Austria, pp. 1-10.

Mannion. "Foundry Networks Enters WLAN Management Fray—Bets on Integration with Wired Infrastructure, Market Timing to Take on Cisco." Electronic Engineering Times, Sep. 8, 2003, p. 32, No. 1286.

(56) References Cited

OTHER PUBLICATIONS

Manodham et al. "A Seamless handoff scheme with new AP module for wireless LANs support VoIP." Proceedings of the 2005 Symposium on Applications and the Internet. IEEE, 2006, pp. 1-6.

Marsh. "Power and Wireless Options Extend Ethernet's Reach: Ethernet's Power-Delivery and Wireless Abilities Offer New Application Potential that Hugely Extends the Reach of the IEEE's 802.X Series of Standards." EDN, Nov. 11, 2004, p. 67, Reed Business Information.

Murray et al. "Intelligent access and mobility management in heterogeneous wireless networks using policy." First International Workshop on Information and Communication Technologies, ACM, 2003, pp. 181-186.

Rist et al. "Wireless LANS—Look, Ma . . . No Wires—Wireless Networking Products Prove They Are Finally Ready for Prime Time." Internetweek, Mar. 20, 2000, p. 41, No. 805, CMP Media, Inc.

Sattari et al. "Seamless Handover Between WLAN and UMTS." 2004 IEEE 59th Vehicular Technology Conference, VTC2004—Spring: Towards a Global Wireless World, May 17-19, 2004, pp. 3035-3038, IEEE. (Abstract).

Thomsen. "Development Platform for Dynamic Bandwidth Allocation Schemes in Future MPCP Enabled Ethernet Passive Optical Network (EPON)." WSEAS Transactions on Communications, Apr. 5, 2006, pp. 92-98, WSEAS. (Abstract).

Xhafa et al. "Seamless Handover in Building Using HVAC Ducts: A New System Architecture." IEEE Global Telecommunications Conference GLOBECOM'03, Dec. 1-5. 2003, pp. 3093-3097, IEEE. (Abstract).

Yaakob et al. "An integration of mobile motion prediction with dedicated solicitation message for seamless handoff provisioning in high speed wireless environment." 2008 International Conference on Electronic Design, Dec. 1-3, 2008, Pernang, Malaysia, pp. 1-5.

Yamagata et al. "Seamless Handover for Hotspot Network Using Adaptive Flow Control Method." 2005 Asia-Pacific Conference on Communications, Oct. 3-5, 2005, pp. 502-506, IEEE. (Abstract).

Wei et al. "Seamless handoff support in wireless mesh networks." IEEE 2006, pp. 1-8.

Zhou et al. "A seamless handoff scheme for Mobile IP." IEEE Vehicular Technology Conference, vol. 2, pp. 927-931, 2006.

Habib et al. "Multi-antenna techniques for OFDM based WLAN." Proceedings of First International Conference on Next-Generation Wireless Systems, Jan. 2006, pp. 186-190.

IEEE. "Part 11: Wireless LAN Medium Access Control (MAC) and Physical Layer (PHY) specifications." IEEE Std 802.11-1997, Nov. 18, 1997, vol. no. pp. i-445.

IEEE. "Part 11: Wireless LAN Medium Access Control (MAC) and Physical Layer (PHY) specifications." IEEE Std 802.11, 1999 Edition (R2003), 2003, vol. no. pp. i-513.

Kitahara et al. "A base station adaptive antenna for downlink transmission in a DS-CDMA system." IEEE 51st Vehicular Technology Conference Proceedings, 2000 (abstract).

Mahler et al. "Design and optimisation of an antenna array for WiMAX base stations." IEEE/ACES International Conference on Wireless Communications and Applied Computational Electromagnetics, 2005 (abstract).

Miaris et al. "On the base stations antenna system design for mobile communications." Electrical Engineering, 2006, vol. 88, pp. 157-163.

Miura et al. "Study of array pattern tuning method using hybrid genetic algorithms for figure-8 satellite's earth station antenna." Asia-Pacific Microwave Conference Proceedings, 2000 (abstract).

Ponnapalli et al. "Design and packaging of antennas for wireless systems." Proceedings of Electrical Performance of Electrical Packaging, 1995 (abstract).

Sarolic. "Base station antenna near-field radiation pattern distortion analysis." Transactions on Engineering Sciences, 2003, pp. 1-10, vol. 41, WIT Press.

Manodham. "A Seamless Handoff Scheme with New AP Module for Wireless LANs Support VoIP." 2006. International Symposium on Applications and the Internet, SAINT 2006, Jan. 23-27, 2006, pp. 253-258, IEEE. (Abstract).

Manodham. "A Seamless Handoff Scheme with New AP Module for Wireless LANs Support VoIP." 2006. International Symposium on Applications and the Internet, SAINT 2006, Jan. 23-27, 2006, pp. 253-258, IEEE. (Abstract.

* cited by examiner

SEAMLESS MOBILITY IN WIRELESS NETWORKS

CROSS-REFERENCE TO RELATED APPLICATIONS

This application claims priority of the following document(s), collectively sometimes referred to herein as the "Incorporated Disclosure". Each of these documents forms a part of this disclosure, and is hereby incorporated by reference as if fully set forth herein.

U.S. patent application Ser. No. 11/715,287 filed Mar. 7, 2007, in the name of inventors Vaduvur Bharghavan, Sung-Wook Han, Joseph Epstein, Berend Dunsbergen, and Saravanan Balasubramanian, assigned to the same assignee, titled "Seamless Mobility in Wireless Networks,", now allowed, which is a continuation of U.S. patent application Ser. No. 11/298,864, filed Dec. 9, 2005, in the name of the same inventors, assigned to the same assignee, and under the same title, now abandoned.

U.S. patent application Ser. No. 11/294,673, filed Dec. 5, 2005, in the name of inventors Rajendran Venugopalachary, Senthil Palanisamy, Srinath Sarang, and Vaduvur Bharghavan, and assigned to the same assignee, titled "Omni-Directional Antenna Supporting Simultaneous Transmission and Reception of Multiple Radios with Narrow Frequency Separation,", now pending.

BACKGROUND OF THE INVENTION

In wireless communication, devices send and receive messages without being physically coupled. Wireless devices can include portable computers, telephones, location sensors (such as those using GPS), and the like. Portable computers with wireless communication capability can be coupled to a computer network, such as the Internet or the World Wide Web. The IEEE 802.11 standard (including 802.11a, 802.11b, and 802.11g) is one known technique for coupling wireless devices to a computer network. In 802.11, wireless devices seek out and select "access points" (herein sometimes called "AP's"), which are themselves physically coupled, for computer communication, to at least a system coordinator. Each wireless device associates itself with a particular AP, with which it communicates. Each wireless device (which might be moving) determines from time to time if it has good communication with its associated AP, and whether it would have better communication with a different AP. Each AP might be coupled to a single device, a collection of devices, or to a computer network.

In any of these cases, the known art exhibits several problems:

One problem is that handoff (deassociating a wireless device from a $1^{st}$ AP, and associating that wireless device with a $2^{nd}$ AP) can take substantial time in relation to the communication. This might constrict the wireless devices and AP's from using their full communication ability. This might also reduce the ability of AP's to provide QoS guarantees that are needed for some uses of wireless devices, such as VoIP and other voice or video applications.

A second problem is that each wireless device chooses the AP it associates with, based only on local state visible to the device. This might create a system of device-to-AP associations that results in sub-optimal usage of the wireless spectrum. This might result in lower performance not only for the wireless device that makes the sub-optimal association decision, but for the network as a whole, since wireless is a shared medium.

SUMMARY OF THE INVENTION

The invention includes a set of communication links between AP's associated with a communication network and any wireless devices desiring contact with that communication network, in which those communication links are operated according to a protocol in which each wireless device selects AP's with which to communicate. This protocol is preferably IEEE 802.11, but might be any other protocol with this property or of this kind. The system coordinator causes the AP's to operate so as to guide each wireless device to an AP selected by the system coordinator. This has the effect that, notwithstanding that the protocol involves having the wireless device make the selection of AP, functionally, the AP's make the selection for it.

In a $1^{st}$ way to perform this function, multiple AP's share an identifier (preferably a BSSID, but other unique identifiers might be used), with the system coordinator directing one particular AP to respond to the wireless device. Since each AP uses the same BSSID to respond to the wireless device, the wireless device cannot tell which AP it is communicating with. This has the effect that the system coordinator can move the wireless device's association with an AP from a $1^{st}$ to a $2^{nd}$ AP, both without knowledge by the wireless device and without the delay introduced by a handoff operation. This also has the effect that the collection of AP's appears to the wireless device as if they collectively form a single cell for communication, personal to that wireless device.

In a $2^{nd}$ way to perform their function, AP's each maintain identifiers substantially unique to each wireless device (preferably BSSID's, but other identifiers might be used), with the system coordinator directing only one particular AP to maintain any particular wireless device's identifier. This has the effect that the system coordinator can move the wireless device's association with an AP from a $1^{st}$ to a $2^{nd}$ AP, both without knowledge by the wireless device and without the delay introduced by a handoff operation. This also has the effect that the collection of AP's appears to the wireless device as if there is only a single AP, personal to that wireless device.

In IEEE 802.11, each AP sends a beacon advertising its presence, and wireless devices can decide to respond to that beacon. When AP's have multiple identifiers to advertise, the AP can collect those multiple identifiers into a single beacon. This has the effect that the AP can send fewer beacons. The AP can also send those individual or aggregated beacons at a relatively higher data rate, with the effect that the beacon does not last any longer for multiple identifiers than for a single identifier.

In cases in which the protocol indicates that the wireless device chooses parameters for communication with the AP (as in IEEE 802.11 and in other protocols), the AP can customize its beacon relative to each identifier, with the effect that the AP can force the wireless device to select from communication parameters preferred by the AP (or the system coordinator). The AP might even restrict the wireless device to only a single set of communication parameters, with the effect of not giving the wireless device any effective choice. In a preferred embodiment, those communication parameters might include parameters for access control, backoff or retry parameters, channel selection parameters, quality of service, transmit power, or some combination of them.

There is no particular requirement that handoff operations must involve actual movement of wireless devices; instead, handoff operations might occur between co-located APs. This has several salutary effects, at least some of which are as follows. (1) The system coordinator can respond to changed communication conditions by balancing loads between AP's, for example co-located AP's or AP's with overlapping effective ranges. (2) Load balancing can be performed transparently to the wireless device, even within a single channel, without delays associated with hard handoffs to different APs. (3) Each AP can operate simultaneously to maximize data rate and throughput while minimizing substantial interference.

DETAILED DESCRIPTION OF THE PREFERRED EMBODIMENT

Generality of the Description

This application should be read in the most general possible form. This includes, without limitation, the following:
  References to specific structures or techniques include alternative and more general structures or techniques, especially when discussing aspects of the invention, or how the invention might be made or used.
  References to "preferred" structures or techniques generally mean that the inventor(s) contemplate using those structures or techniques, and think they are best for the intended application. This does not exclude other structures or techniques for the invention, and does not mean that those structures or techniques would be preferred in all circumstances.
  References to $1^{st}$ reasons for using particular structures or techniques do not preclude other reasons or other structures or techniques, even if completely contrary, where circumstances would indicate that the $1^{st}$ reasons and structures or techniques are not as compelling. In general, the invention includes those other reasons or other structures or techniques, especially where circumstances indicate they would achieve the same effect or purpose as the $1^{st}$ reasons or structures or techniques.

After reading this application, those skilled in the art would see the generality of this description.

Definitions

The general meaning of each of these terms or phrases is intended to be illustrative, and in no way limiting.
  The phrase "access point", the term "AP", and the like, generally refer to devices capable of wireless communication with wireless devices, and capable of wireline communication with other devices. In preferred embodiments, AP's communicate with external devices using a L2/L3 network. However, in the context of the invention, there is no particular requirement that AP's have an actual wireline communication link; AP's might communicate entirely wirelessly.
  The phrase "multiple radios", and the like, generally refers to devices capable of wireless communication with wireless devices while using multiple antennae, frequencies, or both.
  The phrase "L2/L3 network", and the like, generally refers to a communication network in which data packets are transmitted in accordance with the ISO/OSI model. In preferred embodiments, an L2 network includes a LAN, such as an Ethernet-type LAN, while an L3 network includes a packet-switched network, such as multiple LAN's coupled using bridges or routers. However, as noted below, in the context of the invention, where an L2/L3 network is described there is no particular requirement for any particular type of network, whether designated as an L2/L3 network or otherwise.
  The phrases "wireless device", "wireless device", and the like, generally refer to devices capable of wireless communication with AP's. In preferred embodiments, wireless devices implement a wireless communication standard such as IEEE 802.11a, 11b, or 11g. However, in the context of the invention, there is no particular requirement (1) that this particular communication standard is used, e.g., the wireless communication might be conducted according to a standard other than 802.11, or even according to a an IEEE standard entirely, or (2) that all wireless devices each use the same standard or even use inter-compatible communication standards.
  The phrase "wireless communication", and the like, generally refers to radio communication in a region of spectrum allocated for that purpose, or for unlicensed use. In preferred embodiments, wireless communication includes a wireless communication standard such as IEEE 802.11a, 11b, or 11g. However, in the context of the invention, there is no particular requirement that wireless communication must necessarily (1) use radio spectrum, (2) use electromagnetic communication, or even (3) be entirely confined to untethered communication coupling.

Personal cells and personal access points are techniques for communication between AP's and wireless devices over a communication network. In these techniques, a set of communication links are provided between AP's associated with the communication network and any wireless devices desiring contact with that communication network. The communication links are operated according to a protocol in which each wireless device select AP's with which to communicate. It should be noted that this is significantly different from cellular phone networks in which AP's select wireless devices with which to communicate.

In these techniques, the steps of operating include having a system coordinator select information sent by the AP's, with the effect that wireless devices direct their communications to AP's chosen by the system coordinator. It should be noted that this is also different from typical operation of the 802.11 protocol, in which the wireless devices would chose which AP's with which to communicate.

Also in these techniques, multiple AP's provide an illusion to a wireless devices that they are a single AP. An effect is that the need for hard handoffs between AP's is lessened.

System Elements

Figure 1:
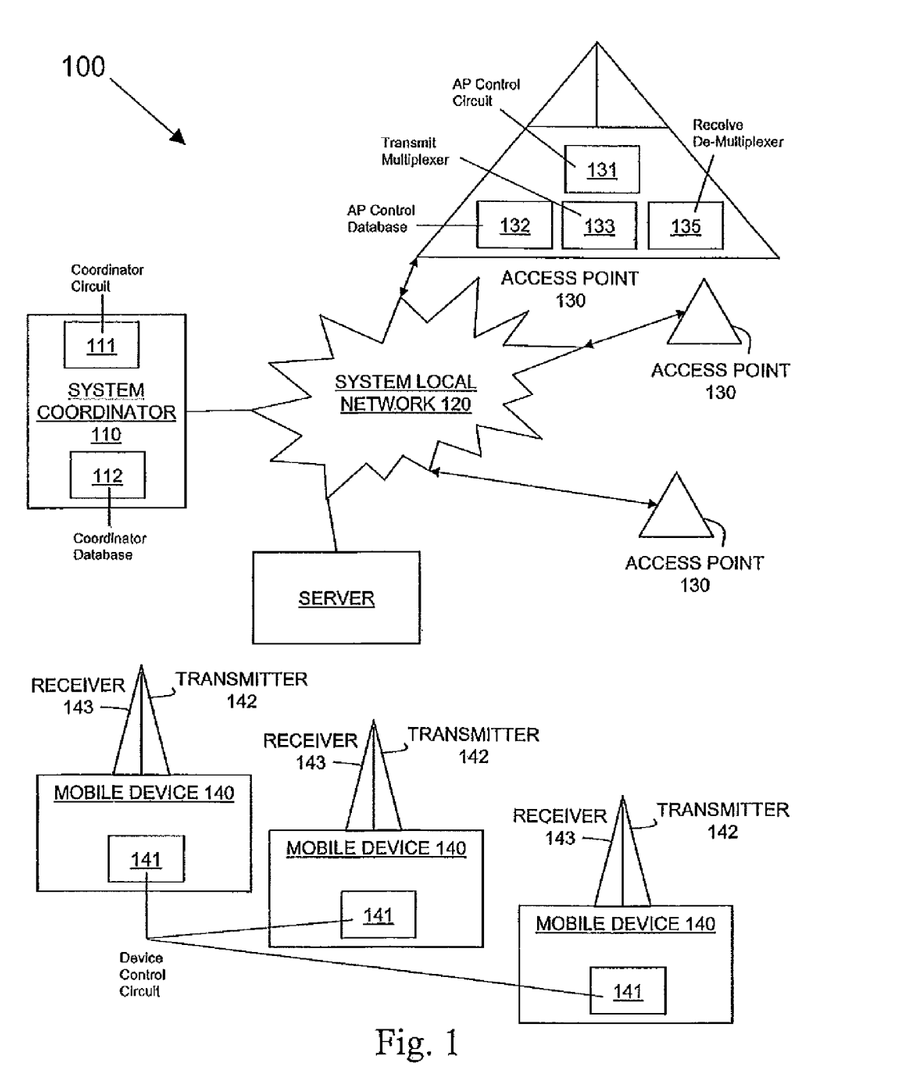
FIG. 1 shows a block diagram of a wireless communication system including access points and wireless devices.

FIG. 1 shows a block diagram of a wireless communication system including access points and wireless devices.

Communication System

In one embodiment, a wireless communication system 100 includes elements shown in the figure, including at least a system coordinator 110, a system local network 120, a set of access points ("AP's") 130, and a set of wireless devices 140.

The system coordinator 110 includes elements shown in the figure, including at least a coordinator circuit 111 and a coordinator database 112. The coordinator circuit 111 includes a computing device, such as a processor, program and data memory, and optionally mass storage. In cases in which the coordinator circuit 111 includes a programmable computing device, it also operates under control of software, optionally distinguished as operating system software and application software.

The coordinator database 112 includes information relating to the status of the system 100, its AP's 130, and its wireless devices 140. This information preferably includes global state information about the AP's, the wireless devices, and the overall system. This information can be collected from the AP's and from the wireless devices through the AP's. The global state information can include, for example, which AP's are communicating with which wireless devices and parameters for those communications. Examples of such parameters can include, but are not limited to, identifiers and other data used by the AP's and wireless devices, signal strength and/or noise level information, and parameters such as data rate for the communications. The system coordinator can make decisions based on global state information, for example instructing AP's about what identifiers and other communication parameters to use. The coordinator circuit 111 operates with the coordinator database 112 to perform such functions, as described further below.

The system local network 120 includes any technique for sending and receiving information between the system coordinator 110 and the AP's 130. In a $1^{st}$ set of preferred embodiments, the system local network 120 includes an L2/L3 network, capable of substantially reliably communicating data packets between the system coordinator no and the AP's 130. However, in the context of the invention, there is no particular requirement for using this technique.

Wireless Device

Each wireless device 140 includes elements shown in the figure, including at least a device control circuit 141, a transmitter 142, and a receiver 143. In a $1^{st}$ set of preferred embodiments, the device control circuit 141 includes a computing device preprogrammed to implement one or more of the IEEE 802.11a, 11b, or 11g protocols, and includes one or multiple radios. One example of a wireless device could be a telephone or mobile computer preprogrammed to operate in a wireless environment. However, in the context of the invention, there is no particular requirement that the device control circuit 141 must be preprogrammed; it may instead include programmable memory, data memory, and optionally mass storage. One example of this distinct type of wireless device could be a mobile computer programmable to discover its wireless environment and operate therein.

Wireless devices make decisions regarding their communication based on local information, for example information about what AP's a wireless device can "hear," information about a communication link and possible communication links sent by AP's to the wireless device, and the like. Wireless devices can choose an AP with which to communicate based on this information.

In some circumstances, a wireless device might choose a sub-optimal AP for communication because it lacks global information about other AP's. The system coordinator can affect this choice by controlling communication parameters used by the AP's with respect to that wireless device, thereby steering a wireless device's choice to a desired AP.

Access Points

In a preferred embodiment, each access point (AP) 130 includes elements shown in the figure, including at least an AP control circuit 131, an AP control database 132, a transmit multiplexer 133, and a receive de-multiplexer 135.

The AP control circuit 131 includes a computing device, such as a processor, program and data memory, and optionally mass storage. In cases in which the AP control circuit 131 includes a programmable computing device, it also operates under control of software, optionally distinguished as operating system software and application software.

The AP control database 132 includes information relating to the status of the system 100, the particular AP 130, and those wireless devices 140 assigned to that AP 130. The AP control circuit 131 operates with the AP control database 132 to perform functions described below.

The AP control circuit 131 determines which signals it desires to send and on what frequencies, and sends that information to the transmit multiplexer 133. The transmit multiplexer 133 causes those signals to be multiplexed onto those frequencies using one or more radios. This system allows wireless devices to associate with one frequency, as well as allowing wireless device devices that support "channel bonding", i.e., can support multiple frequencies simultaneously.

The receive de-multiplexer 135 causes the multiplexed signals to be separated into their frequency-modulated information components, and couples those information components to the AP control circuit 131.

After reading this application, those skilled in the art will realize that combined operation of the AP control circuit 131, the transmitter multiplexer 133, and the receive de-multiplexer 135, have the effect that the AP 130 can transmit or receive on any of its available frequencies. It is desirable for the AP 130, when sending and receiving, to not have its own transmission interfere with its own reception.

Personal Cell Model

In a personal cell model for a wireless communication system, an identifier such as a BSSID is maintained at a plurality of AP's for each wireless device. These AP's appear to each wireless device as if they were a single AP that communicates with the wireless device using that identifier. A wireless device selects that single AP as the one with which it will communicate. The system coordinator selects one of the AP's for actually communicating with the wireless device, and might change that selected one of the AP's from time to time, without the wireless device having any knowledge. The remaining AP's can listen passively to communication by the wireless device.

Figure 2:
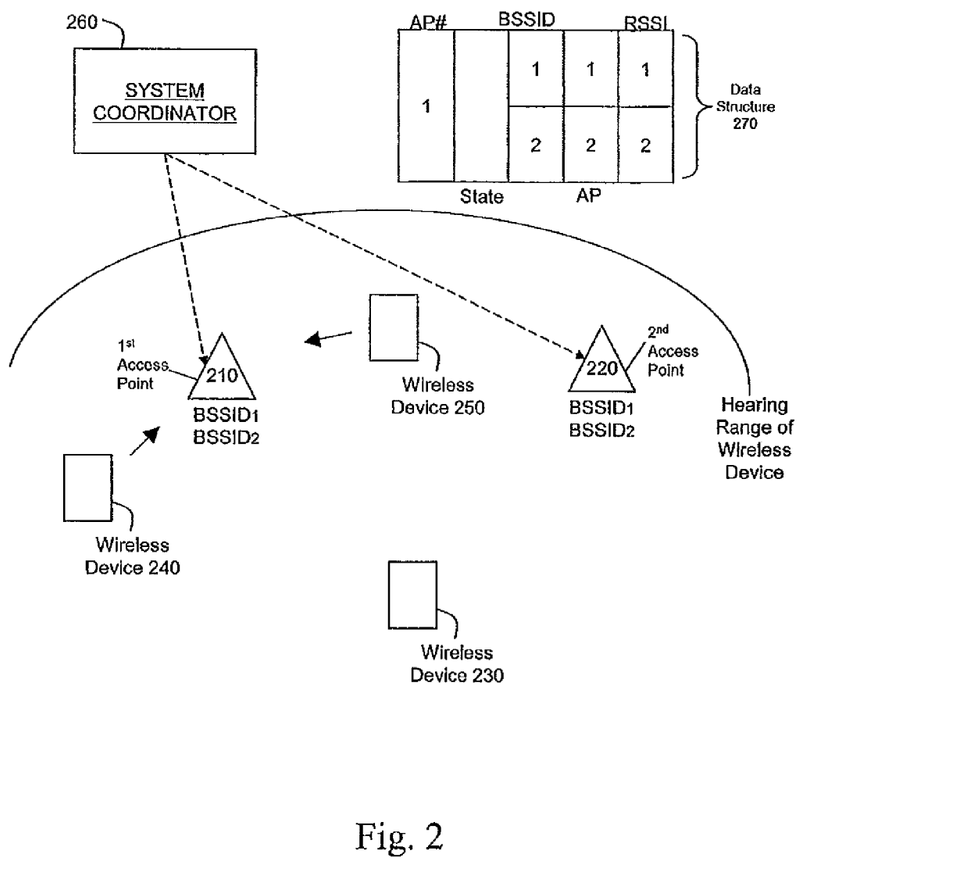
FIG. 2 illustrates one embodiment of a personal cell model for a wireless communication system.

FIG. 2 shows one example of an embodiment including a personal cell model. The figure shows a first access point 210 and a second access point 220. The figure also shows a set of three wireless devices 230, 240, and 250 and a system coordinator 260. In the context of the invention, there is no particular requirement for these particular numbers of AP's and wireless devices; actual embodiments might have different numbers, i.e., more or fewer, AP's and wireless devices.

Each AP maintains a data structure such as a data structure 270. The data structure 270 preferably includes a set of entries, each entry preferably including an AP identifier, a value for a state of the AP, a set of identifiers for wireless devices (here shown as BSSIDs), a value that identifies the AP currently actively communicating with each wireless device, and at least one value that indicates a received signal strength indicator (RSSI), i.e., a measure of received signal strength, for that communication. The system coordinator 260 handles sharing of information between AP's as needed to maintain the data structure 270 at each AP.

In this example, all the relevant AP's in the system maintain the identifier of each wireless device in the system. (In practice, only those AP's near to, i.e., within radio co-channel interference range of, the wireless device need actually maintain the identifier of any particular wireless device.) Any one of the AP's within radio range of the wireless device can actively communicate with any one of the wireless devices using the identifier for that wireless device. The other AP's can passively listen to the communication so as to keep their RSSI information up to date.

A first AP sends communications to the wireless device while one or more AP's (possibly including the first AP) receive communications from the wireless device. One effect of this technique is that the wireless device effectively sees only a single AP or with which it communicates, even though it might in reality be communicating with different AP's at different times.

The system coordinator monitors each active wireless communication. Based on the characteristics of the communication, the system coordinator can determine which AP will be associated (or reassociated) with the wireless device for active communication. This is represented by the dashed lines in the figure between the system coordinator 260 and the AP 210 and the AP 220.

In a preferred embodiment, the system coordinator considers multiple characteristics of the communication link between the AP's and the wireless device. These characteristics might include signal strength and other L0/L1 characteristics relating to the signal—the amount of noise, how "bursty" that noise is (whether noise occurs relatively evenly or not), the type of noise (whether noise is concentrated on certain frequencies, or other types of noise), the number of multipath images of the signal, and the like. These characteristics might include data rate and other L2/L3 characteristics relating to the communication link—the data rate transmitted within a wireless LAN, the information throughput in a switched network, the ability to provide QoS to multiple requestors, and the like. More generally, any characteristic of communication the system coordinator can control by associating the wireless device with a particular AP of the system coordinator's choice might be included in the communication characteristics used to determine how to optimize handoff.

Changing the AP with which a wireless device is associated for wireless communication is sometimes referred to as a "handoff" herein. Reasons for performing a handoff can include, but are not limited to, changes in RSSI data, optimizing load on wireless devices and/or AP's, changes in characteristics of the communication, number of QoS flows, etc.

When the system coordinator determines that a particular AP should communicate with a particular wireless device, the system coordinator tells that AP to associate (or reassociate) itself with the wireless device for active communication. The wireless device does not need to take any action. In other words, the handoff (sometimes called a "soft handoff" herein), generally occurs without the wireless device even being aware of it. Preferably, no messages need to be exchanged between the wireless device and the AP's to carry out the soft handoff. Rather, from the wireless device's point of view, nothing changes. The infrastructure of the system (i.e., system coordinator and AP's) preferably carries out the soft handoff entirely on its end.

An effect of this technique is that "hard handoffs", i.e., handoffs of which the wireless device is aware and which involve a handoff according to the communication protocol in use, and the communication delays associated therewith, can be minimized. Hard handoffs take more time than soft handoffs; hard handoffs require messages to be exchanged between a wireless device and the AP's involved in the handoff. The more wireless traffic already present, the longer this message exchange can take. This often results in a noticeable break in service. In contrast, as discussed above, the soft handoff enabled by the personal cell takes much less time and preferably are not even noticed or known about by the wireless device.

One reason the system coordinator might determine that a particular AP should communicate with a particular wireless device is that the RSSI for that AP becomes better than the RSSI for an AP currently in active communication with the wireless device. This might occur, for example, if the wireless device moves.

A second reason the system coordinator might determine that a particular AP should communicate with a particular wireless device is that it changes the interference pattern in the collection of AP's and wireless devices communicating in a shared wireless channel, with the intent of optimizing aggregate utilization of the shared spectrum. This might occur even if the wireless device does not move, but the communication pattern of transmitters in the shared medium changes.

The possibility of a soft handoff provides for a new capability—a soft handoff between AP's that are co-located, or from a particular AP back to itself, might be performed. This provides the system coordinator with additional tools for managing the set of communication links. For example, the system coordinator might perform load sharing across multiple AP's. After reading this application, those skilled in the art will recognize that other and further circumstances can arise wherein soft handoffs are desirable.

The system coordinator might wish to force a wireless device to change its identifier (e.g., the BSSID for that wireless device), even if it wishes to retain the same AP for communication with that particular wireless device. For a $1^{st}$ example, the system coordinator might wish to alter communication parameters with a particular wireless device. For a $2^{nd}$ example, as described in more detail with regard to a "personal AP" model, the system coordinator might wish to assign that BSSID or other identifier to a different wireless device.

In changed communication conditions like or similar to those described above, the system coordinator might instruct an actively communicating AP to force a hard handoff, in which the wireless device must select a new identifier. Hard handoffs might also be desirable in certain circumstances related to the operation of a particular wireless communication chipset such as the Atheros chipset.

In the IEEE 802.11 protocol, and possibly other protocols, AP's advertise their presence and availability to communicate using particular identifiers. In IEEE 802.11, messages by which the AP's advertise are called "beacons". The protocol contemplates that each AP will have only a single identifier to advertise in each beacon. In many circumstances, the AP is only concerned with sending the information in the beacons to a single wireless device, or a chosen set of wireless devices. As a result, the data rate for the beacons can be maximized for that particular set of AP/wireless device communication.

In some embodiments, it might be possible to combine beacons (sometimes called "coalescing"). In these embodiments of the invention, (1) each AP might advertise multiple identifiers in one beacon, (2) each AP might alter the communication parameters for its beacon, such as for example data rate or signal strength, to account for the number of identifiers in that beacon, and (3) each AP might customize the information in its beacon for each one of the multiple identifiers, such as for example indicating specific communication parameters for each such identifier, whether all in the same beacon or in distinct beacons. These communication parameters can include, but are not limited to, access control parameters, backoff or retry parameters, channel selection parameters, quality of service parameters, and transmit power parameters The system coordinator preferably has sufficient information, for example the communication parameters and the RSSI data between each AP and each wireless device, to customize the beacon messages so as to lessen interference with other communications. In addition, the number of messages sent can be responsive to such RSSI data and to a number of the identifiers to be sent. For a large number of identifiers, more messages can be sent so that each message interferes less with other communications (i.e., uses less communication bandwidth).

Personal Access Point Model

In a personal access point model, each wireless device is associated with a substantially unique identifier, such as a substantially unique BSSID. Identifiers are only "substantially" unique, in that it is possible that identifiers are reused elsewhere where radio co-channel interference is substantially nil. In preferred embodiments, when wireless devices with equal or equivalent identifiers enter a region where co-channel interference is no longer insignificant, the system coordinator preferably attempts to change at least one of those identifiers. Each particular wireless device has its substantially unique identifier associated with substantially only one of a plurality of AP's to enable communication between that AP and the wireless device with that identifier, specifically, the one AP the system coordinator selects for communication with the wireless device.

Figure 3:
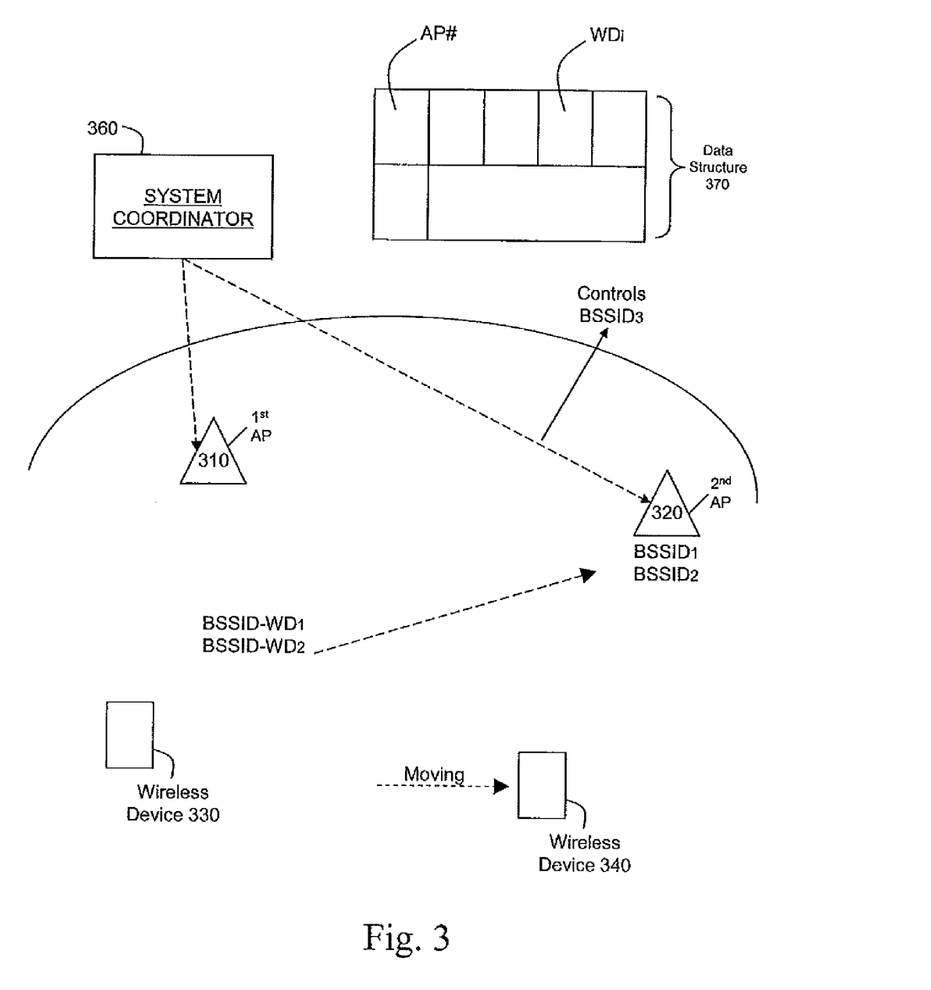
FIG. 3 illustrates one embodiment of a personal access point model for a wireless communication system.

FIG. 3 shows one example of a personal AP model. The figure shows a first AP 310 and a second AP 320. The figure also shows a set of wireless devices 330 and 340 and the system coordinator 360. In the context of the invention, there is no particular requirement for these particular numbers of AP's and wireless devices; actual embodiments might have different numbers, i.e., more or fewer, AP's and wireless devices.

The AP's preferably maintain data structures such as data structure 370. This data structure is explained in more detail below with reference to FIG. 4, FIG. 5, and FIG. 6. Generally, the data structure describes an association between a particular AP with one or more identifiers (e.g., BSSID's) for one or more selected wireless devices. This association is preferably limited to those AP's that are going to actively communicate with those selected wireless devices.

When a wireless device needs to communicate with a different AP, the wireless device's identifier is associated or reassociatied with that other AP. This is unlike other wireless systems in which the wireless device would have to change its identifier in order to communicate with a new AP through a hard handoff. For a $1^{st}$ example, the wireless device might have moved, and no longer has a good communication link with its former AP. For a $2^{nd}$ example, the system coordinator might desire to move the wireless device's association to a different AP for load balancing. After reading this application, those skilled in the art will recognize that this technique has other and further uses.

The system coordinator 360 preferably controls these steps of associating or reassociating by instructing or providing information to the AP's so that they change the associated identifiers in their data structures 370. This is illustrated by the dashed lines between the system coordinator 360 and the AP's 310 and 320 in the figure.

In the personal AP model, the set of communication links appears to the wireless device identical to the personal cell model. The wireless device does not need to take any action when the system coordinator moves its association to another AP. Similar to the personal cell model, a soft handoff preferably occurs without the wireless device having any knowledge thereof. Rather, the infrastructure of the system (i.e., system coordinator and AP's) preferably carries out the soft handoff entirely on its end. Also similar to the personal cell model, one effect of this technique is that hard handoffs and their associated communication delays can be minimized.

Similar to the personal cell model, soft handoffs might be used when a wireless device moves so that another AP is better situated to communicate with the wireless device (for example, as reflected by RSSI data, load optimization considerations, changes in characteristics of the wireless communication, number of QoS flows, etc.). Also similarly, situations may arise where a soft handoff between co-located AP's is desirable. Changes in other communication conditions might warrant a soft handoff. After reading this application, those skilled in the art will recognize that this technique has other and further uses. Also similar to the personal cell model, it might be desirable to force a hard handoff in some cases.

In the foregoing descriptions of FIGS. 2 and 3, a BSSID was used as an example of the identifier. However, identifiers are not limited to just BSSID's. Other identifying data such as a mobility domain can be used as part of the identifier. One example of such an identifier is described below with reference to FIGS. 4 and 5. Identifiers of completely different types that do not include mobility domains or BSSID's are also within the scope of the invention.

Data Structures for Personal Access Point

Figure 4:
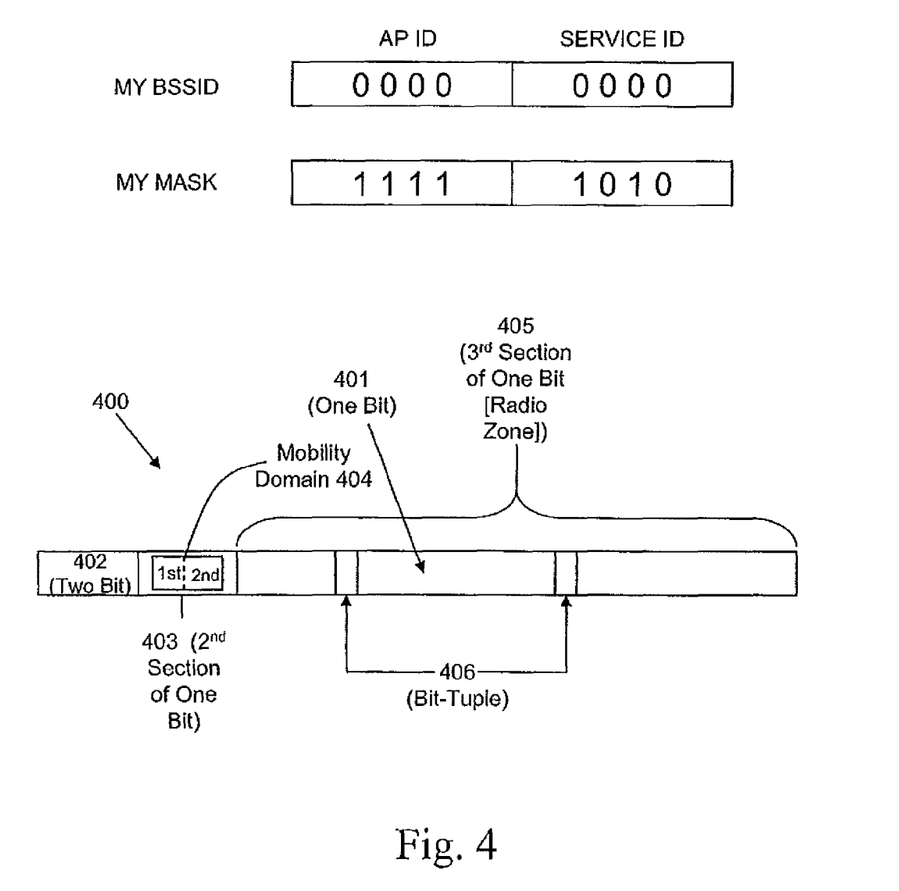
FIGS. 4 and 5 show data structures used for a personal access point model for a wireless communication system.
Figure 5:
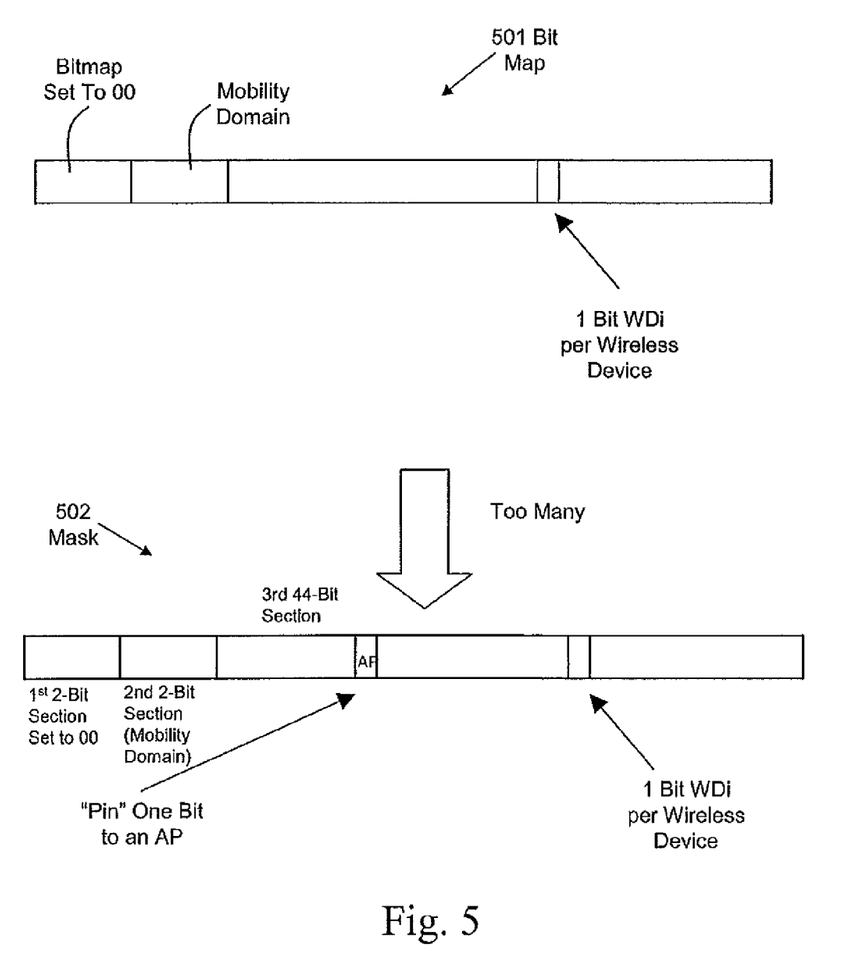

In one embodiment, each wireless device is assigned an identifier as described with respect to FIG. 4 and FIG. 5. FIG. 4 shows an identifier assigned to a wireless device. FIG. 5 shows a pair of data structures used by an AP.

An identifier 400 includes a sequence of individual bits 401, preferably 48 such bits 401 as would be used to describe a MAC address or BSSID. When used to describe a MAC address or BSSID, a $1^{st}$ (two bit) section 402 of those individual bits 401 are substantially permanently set to "00" (two zero bits), with the effect that the identifier 400 can be recognized as a MAC address or BSSID.

A $2^{nd}$ section 403 of those individual bits 401 are set to a value describing a mobility domain 404. In a preferred embodiment, the $2^{nd}$ section 403 includes two to three individual bits 401; however, in the context of the invention there is no particular requirement for using this number of individual bits 401, and other or different numbers might be used. Moreover, in the context of the invention there is no particular requirement for this number of individual bits 401 to be fixed; the number of individual bits 401 might be dynamically maintained by the AP at the direction of the system controller, or otherwise.

In one embodiment, a mobility domain 404 indicates a logical or physical region in which wireless devices are expected to be present. The system controller recognizes wireless devices that leave a $1^{st}$ mobility domain 404 and enter a $2^{nd}$ mobility domain, and causes them to be reassigned to a new identifier 400. This typically involves a hard handoff, in which the wireless device is instructed to deassociate from the earlier identifier 400 and newly associate with the new identifier 400.

In cases in which a mobility domain 404 indicates a physical region, this has the effect that wireless devices physically crossing a boundary between a $1^{st}$ and a $2^{nd}$ physical region, each associated with a particular mobility domain 404, leave a $1^{st}$ mobility domain 404 and enter a $2^{nd}$ mobility domain 404. In cases in which a mobility domain 404 indicates a logical region, this has the effect that wireless devices might be reassigned from a $1^{st}$ to a $2^{nd}$ mobility domain 404 without necessarily moving across a physical boundary between two mobility domains 404.

Mobility domains also can be assigned to channels, for example with one mobility domain per channel. Seamless mobility is thereby enhanced because load on the channel over a coverage area can be optimized.

As described below, using a mobility domain 404 to indicate logical regions as well as, or instead of, physical regions, provides the system controller with the ability to logically move wireless devices, both among AP's and otherwise. For a $1^{st}$ example, the system controller might move wireless devices from a $1^{st}$ to a $2^{nd}$ mobility domain 404 for load sharing. For a $2^{nd}$ example, the system controller might move wireless devices from a $1^{st}$ to a $2^{nd}$ mobility domain 404 to alter their parameters for communication with AP's. For a $3^{rd}$ example, as described below, the system controller might move wireless devices from a $1^{st}$ to a $2^{nd}$ mobility domain 404 to account for those cases in which there is a conflict between identifiers 400 assigned to distinct wireless devices, as also described below and in more detail with respect to FIG. 6 and FIG. 7.

The identifier 400 includes a $3^{rd}$ section 405 of those individual bits 401, in which ones and tuples of those individual bits 401 are assigned to particular wireless devices. As also described below and in more detail with respect to FIG. 6 and FIG. 7, each wireless device entering the radio co-channel interference range of an AP and its neighbors (the AP's "radio zone" 405) is assigned one of those individual bits 401 as its substantially unique identifier 400. As additional wireless devices enter the AP's radio zone 405, each one is assigned a distinct one of those individual bits 401 as its substantially unique identifier 400. When the ones of those individual bits 401 are all allocated, additional wireless devices entering the AP's radio zone 405 might be assigned to distinct mobility domains 404 at the same AP, with the effect of substantially distinguishing their identifiers 400 from those of all other wireless devices in the AP's radio zone 405.

If there are two bits in the $2^{nd}$ section 403, there will be $2^2$ defined mobility domains 404, and 48–2–2 (i.e.) 44) defined individual bits 401 allocated to wireless devices, for a combination of 176 distinct identifiers supported by a single AP. If there are three bits in the $2^{nd}$ section 403, there will be $2^3$ defined mobility domains 404, and 48–2–3 (i.e., 43) defined individual bits 401 allocated to wireless devices, for a combination of 344 distinct identifiers supported by a single AP. The number of bits reserved for the $2^{nd}$ section and defining mobility domains 404 is preferably dynamically determined by the system controller.

If additional wireless devices enter the AP's radio zone 405 and those additional wireless devices all wish to communicate with the same AP, the system controller might safely assign them the same identifiers 400 as other wireless devices communicating with the same AP. At worst case, two wireless devices nearly simultaneously communicating with the same AP will cause a data collision, requiring no more than backoff and later retransmission.

If still more additional wireless devices enter the AP's radio zone 405, the system controller might safely lock one or more of those individual bits 401, with the effect that each such wireless device newly entering the AP's radio zone can be assigned a bit-tuple 406 (a bit-pair when one bit is locked, a bit-triple when two bits are locked, and the like). Each time a bit-tuple 406 of length V is generated, a number equal to $(2^v-1)-V$ new identifiers become available for the system controller to assign to wireless devices. However, when a bit-tuple 406 is assigned to a wireless device, its individual bits 401 should not be reassigned until that particular wireless device is the only wireless device using that bit-tuple 406. In the event the system controller wishes to reassign those individual bits 401 without waiting for this condition, the system controller might cause a hard handoff by the wireless device, and assign it to a new substantially unique identifier 400.

As described above, FIG. 5 shows a pair of data structures used by an AP in one embodiment of the invention.

First data structure 501 is a bit map such as the Atheros (chipset) BSSID. Second data structure 502 is a mask. If a wireless device with an identifier attempts to communicate with an AP with a given bit map and a given mask, the AP will acknowledge the attempt if the following is true:

$$\text{identifier AND mask} = \text{bitmap} \tag{1}$$

The bitmap is generally set to all 0s, except as noted below. This equation has the effect of masking out (by ANDing with 0) any unused bits in the mask. Thus, wireless devices with identifiers that have a 1 corresponding to an unused bit are acknowledged.

In the case of the Atheros chipset and a BSSID used as a wireless device's identifier, equation (1) is equivalent to the following:

$$\text{BSSID (of wireless device) AND mask} = \text{Atheros BSSID} \tag{2}$$

If a wireless device with a given identifier is acknowledged, the mask is updated as follows:

$$\text{mask} = \text{mask OR identifier} \tag{3}$$

This has the effect of updating the mask so that a wireless device with a same identifier as a wireless device that has already been acknowledged will not satisfy equation (1) above.

Data structure 502 in FIG. 5 indicates fields for the mask according to an embodiment of the invention. This embodiment can be used with the Atheros chipset and BSSIDs (including mobility domains). Applicability to other chipsets, identifiers, and different lengths of bit fields would be apparent to one skilled in the art.

In one embodiment, the $1^{st}$ (two bit) section of the mask is set to zeros, which correspond to the first (two bit) section of wireless devices' identifiers discussed above with respect to FIG. 4. The $2^{nd}$ (two bit) section corresponds to the mobility domain. The $3^{rd}$ (44 bit) section corresponds to 44 wireless devices if one bit of the section is used for each wireless device.

The identifiers and masks can be adapted to accommodate more than 44 wireless devices. In particular, if more wireless devices are needed, a bit of the $3^{rd}$ (44 bit) section of the identifier can be "pinned" to a particular access point. In other words, wireless devices communicating with that access point will have that bit set to a 1 as well as their own identifying bit.

In cases in which all wireless device identifiers associated with the AP have a 1 at the pinned bit, the mask will have a 1 at the pinned bit when checking equation (1) for received messages. In order that equation (1) can still be satisfied for those wireless devices at the AP corresponding to the pinned bit, the bitmap for that AP is modified by placing a 1 at the location of the pinned bit.

The pinned bit is no longer available for identifying a particular wireless device. Different bits can be set for different access points. As described above, an effect is that when a $V^{th}$ bit is "pinned" to an access point, $2^v-v-1$ possibilities for wireless devices are added. Thus, sufficient wireless devices can be accommodated for a great many applications.

The mask is automatically updated by equation (3) above to accommodate the pinned bit(s). Therefore, the operation of the access point can be adapted to use "pinned" bits with relative ease.

The assignment of identifiers to wireless devices, and if necessary, the pinning of bits at the wireless devices and the AP preferably are controlled by the system coordinator. An effect of this is that the system coordinator can control which wireless devices communicate with which APs.

Initial Assignment of Identifier

For each AP radio, the system coordinator preferably maintains a set of other AP radios with which it interferes. For each AP radio, the system coordinator maintains a vector of assignments (ASV), where each bit in the ASV denotes the corresponding '1' in the identifier (e.g., BSSID) of the personal AP allocated for a wireless device that is assigned by the system coordinator to the AP radio. For each AP radio, the system coordinator maintains an availability vector (AVV), where each bit in the AVV denotes that a conflict free identifier may be constructed with only the corresponding bit set to '1'.

When a wireless device comes into a preferred embodiment of the system, it first looks for access points and sends a "probe request" message. Every AP in the neighborhood of the wireless device receives this message. The "probe request" message triggers a "probe indication" message from the AP to the system coordinator. When the system coordinator receives a probe indication from an AP for a wireless device, it needs to generate a identifier for that device, so that future communications can take place with the said device on the selected identifier. The following are the rules preferably used for generation of the identifier:

1. If there is a bit available in the AVV, construct a identifier by randomly selecting a bit from the AVV, and prefixing with the mobility domain. This device has been allocated its personal AP.
2. If there is no bit available in the AVV, check to see if there is an identifier to which multiple devices have already been allocated. If so, provide this identifier to the device. This device has been allocated a shared identifier.
3. If there is no such identifier above, check to see if there is a identifier sharing the same SSID (or network service) that the new device has. If so, convert that identifier from a personal AP to a shared AP. The incoming device has been allocated a shared AP, and some existing device in the network also has its personal AP converted to a shared AP.
4. If there is an existing shared identifier (i.e. a identifier with more than one '1' except for the mobility domain) that is available for allocation, select it. This device has been allocated a shared AP.
5. If there is no identifier available in the shared pool, then increase the number of '1' bits in the identifier from the set of assigned pool of identifiers. This will create new identifiers in the shared pool. Select one identifier from the shared pool, and allocate to the device. This device has been allocated a shared AP.

Conflicts Between Identifiers

Figure 6:
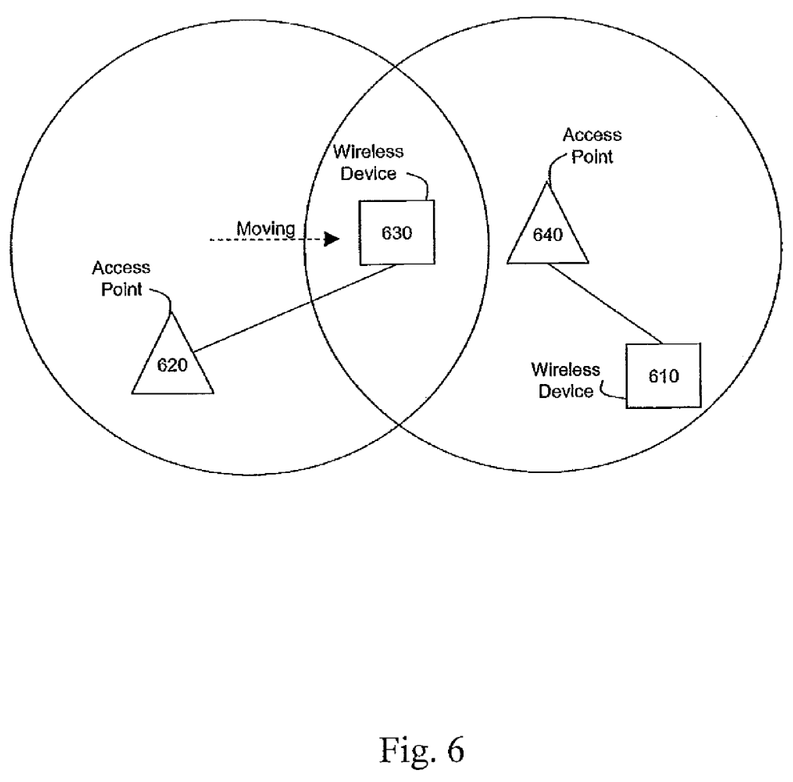
FIGS. 6 and 7 show conceptual diagrams of two cases that can result in hard handoffs between wireless devices using personal access points.
Figure 7:
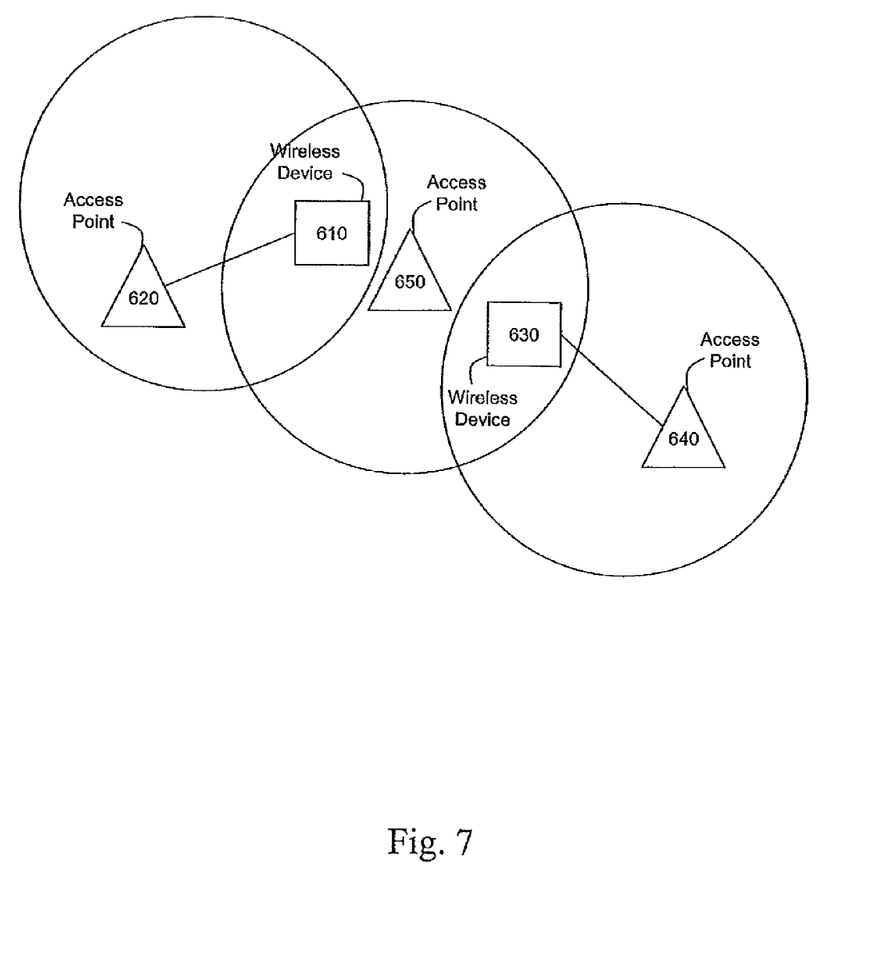

FIGS. 6 and 7 show conceptual diagrams of two cases that can result in hard handoffs between wireless devices using personal access points.

In FIG. 6, mobile device 610 is actively communicating with access point 620, and mobile device 630 is actively communicating with access point 640. The circles around the access points indicate their effective range for communicating with the mobile devices.

In this example, both mobile devices have the same identifier for communication with their associated access point. This would not be a problem except that mobile device 610 has moved within the effective range of access point 640. Thus, mobile device 610 has two AP's in its neighborhood, AP 620 and AP 640, with the same. This causes both the AP's to acknowledge transmissions from mobile device 610, thereby causing collisions. This will force a deauthorization of one of the mobile devices, which will then have to get a new identifier through a hard handoff. The hard handoff to a new identifier preferably is under control of the system coordinator.

In FIG. 7, mobile device 610 is actively communicating with access point 620, and mobile device 630 is actively communicating with access point 640. Access point 650 is also present in the system. Again, the circles around the access points indicate their effective range for communicating with the mobile devices.

In this example, both mobile devices have the same identifier for communication with their associated access point. Furthermore, neither mobile device is within the effective range of the access point associated with the other mobile device. However, a problem still can arise if both mobile devices are within the effective communication range of another access point. This is illustrated in FIG. 7, where both mobile devices 610 and 630 are within the effective range of access point 650.

Even though access point 650 is not actively communicating with either mobile device, it still may be passively listening, sending beacon messages, and the like. In addition, one or both of the mobile devices may have a soft handoff to the access point 650. Thus, having multiple AP's with the same identifier in the range of a mobile device is not desirable. A system coordinator preferably will recognize this problem and force a hard handoff of one of the mobile devices to a new identifier.

Soft Handoff and Hard Handoff

In a preferred embodiment, the system coordinator periodically executes an algorithm to make its handoff decisions. In this periodic check, the system coordinator preferably does the following:

1. For each wireless device, the system coordinator determines if there is any conflict for that wireless device, i.e. if there exist two AP's in its interference range that have the same BSSID to which that particular wireless device is communicating. If the system coordinator determines that such a conflict exists, it may preferably deassociate the wireless device and cause a hard handoff to a different BSSID to eliminate the conflict.
2. For each wireless device, the system coordinator determines if there is an AP neighbor that is better suited to serve the device (e.g. it has a better RSSI for the device), and to which the current BSSID of the device can be transferred without creating conflict for (a) the said device, or (b) any of the devices that are within the interference range of the said AP. If so, the system coordinator can execute a "soft handoff" to the best such AP neighbor.
3. For each wireless device, the system coordinator determines if the current service is poor (e.g. RSSI lower than a configured threshold, or significant loss of messages between the wireless device and its communicating AP), and if there is a significantly superior AP that can serve the device (e.g. it has significantly better RSSI for the device). In this case, even if the soft handoff criterion described above fails, the system coordinator may preferably initiate a "hard handoff" by disassociating the device from its current AP and only allowing it to enter the new AP on a different BSSID.

Clock Synchronization

In both the personal AP model and the personal cell model, multiple AP's are providing an illusion to wireless devices that they are a single AP. In a preferred embodiment of the system, the clocks of the AP's should be synchronized in order to facilitate proper communications. The AP's monitor common wireless devices and record their packet reception times. These packet reception times, along with corresponding packet IDs, are sent to the system coordinator. This allows the system coordinator to maintain a digest of clock offsets, and to signal back to each AP to adjust its clock offset, with the effect of synchronizing the AP clocks. One effect of this is that even when a wireless device sees two beacons from different AP's, no time mismatch or only a negligible time mismatch is present.

Beacon Synchronization

In a preferred embodiment, the system coordinator also synchronizes several beacon parameters. For example, 802.11 has a mechanism wherein wireless devices can go into power-save mode, and wake up only periodically to monitor a beacon. When there is a packet for a wireless device in power-save mode, the AP buffers the packet. The beacon packet has a field where it identifies which wireless devices have packets buffered for them. The wireless devices can then request to receive these buffered packets. Because the wireless device believes that it is communicating with only one AP, when in fact it might be communicating with more than one AP that are providing the illusion of being a single AP, the wireless device might latch onto a beacon from an AP other than the one buffering its messages. Beacon information among the AP's is preferably synchronized. This has the effect of helping buffered packets get to wireless devices when they wake up.

Generality of the Invention

This invention should be read in the most general possible form. This includes, without limitation, the following possibilities included within the scope of, or enabled by, the invention.

Communication throughput using AP's can be substantially increased, much closer to the maximum theoretical capacity in the case where each AP uses the entire available wireless spectrum.

Handoff of wireless devices from a $1^{st}$ AP to a $2^{nd}$ AP can be substantially sped up, much closer to the minimum theoretical time for the system to find a superior AP for a moving wireless device, and to reassign (reassociate) that wireless device to a new AP.

Soft handoff between two AP's can be accomplished without any messaging with the mobile device, thereby making the handoff time independent of the amount of traffic over the communication channel.

Handoffs between frequencies on a same access point are enabled.

Alternative embodiments are also applicable to non-802.11 protocols, and are particularly useful in environments where the digital protocol involves commutativity of channels between transmitter and receiver.

Alternative embodiments provide for deployment of co-located AP's that support multiple frequencies. This has the effect of providing for better handoff, with the effect of making deployment much easier. Optimization occurs primarily across frequencies and not across both frequencies and substantially spatial distances.

Alternative embodiments might provide for simultaneous optimization of both peak and aggregate throughput; in the context of the invention, there is no particular requirement for frequency planning across AP's.

Alternative embodiments support different radios having different transmit power and receive power, with the effect of providing different coverage planning on different channels.

Alternative embodiments provide for radios to perform collision detection in a broadcast wireless medium. With the 802.11 packet handshake detecting frame-level collision, the invention provides for reception on the same channel while transmitting, with the effect that recovery from collisions is relatively faster.

Alternative embodiments provide for use of CSMA/CD protocols as well as CSMA/CA protocols.

Advantages of the invention include:
1. The ability to hand off without any over the air messages.
2. Achieving handoff times that are independent of the amount of traffic on the communication channel.
3. The ability to perform load balancing transparent to the clients.
4. Support for different client implementations in a single infrastructure, optimizing handoffs for all clients equally, regardless of client implementations or algorithms.
5. Ability to optimize channel parameters (particularly data rates) for clients.

After reading this application, those skilled in the art would see the generality of this application.

The invention claimed is:

1. A computer-implemented method in a system coordinator to provide seamless mobility to an end point in a wireless network by controlling soft handoffs of the end point among access points with the use of a persistent, uniquely-assigned BSSID (Basic Service Set Identifier), comprising:

selecting at least one communication parameter to associate with a BSSID;

sending a beacon from a first access point to advertise its presence, wherein the beacon comprises the BSSID associated with the at least one communication parameter;

responsive to the mobile station choosing the BSSID being advertised in the beacon sent from the first access point, selecting to uniquely assign the BSSID to a mobile station;

associating the first access point from the plurality of access points with the mobile station, wherein associating comprises using the uniquely-assigned BSSID with the mobile station persistently and associating is made as selected by the system coordinator, the uniquely assigned BSSID being independent of an identify of mobile station and being eligible for subsequent assignment to a different mobile station as determined by the system coordinator;

determining that the mobile station should be handed-off from the first access point to a second access point among the plurality of access points;

handing-off the mobile station by changing associations of the uniquely-assigned BSSID from the first access point to a second access point, wherein a coordinator database of the system coordinator is updated according to the change, the coordinator database storing a plurality of access point identifiers in association with a plurality of mobile station identifiers, wherein the uniquely-assigned BSSID is persistent due to the mobile station maintaining the uniquely assigned BSSID through hand-offs between access points; and responsive to the hand-off, seamlessly continuing communication with the mobile station at the second access point while using the same uniquely-assigned BSSID without change at the mobile station, such that the mobile station continues communication with the second access point as if communication was still occurring with the first access point.

2. The method of claim 1, wherein associating the mobile station comprises: associating the mobile station with the first access point in a wireless network using the uniquely-assigned BSSID among a plurality of stored uniquely assigned BSSIDs assigned to a plurality of mobile devices.

3. The method of claim 1, wherein associating the mobile station comprises: associating the mobile station with the first access point in a wireless network using the uniquely-assigned BSSID among a plurality of stored uniquely assigned BSSIDs assigned to a plurality of mobile devices, wherein the plurality of stored uniquely-assigned BSSIDs are stored at the first access point to facilitate communication between the first access point and the plurality of mobile devices.

4. The method of claim 1, wherein associating the mobile station comprises: associating the mobile station with the first access point among the plurality of access points in the wireless network using the BSSID that is uniquely assigned to the mobile station, wherein the mobile station operates according to a protocol in which the mobile station natively selects access points with which to communicate.

5. The method of claim 1, wherein associating the mobile station further comprises:
associating the mobile station with the first access point, wherein the mobile station is within range of at least two access points of the plurality of access points.

6. The method of claim 1, wherein handing-off the mobile station comprises:
disassociating the mobile station by deleting the uniquely-assigned BSSID stored at the first access point in favor of associating the mobile station by storing the uniquely-assigned BSSID at the second access point.

7. The method of claim 1, wherein handing-off the mobile station comprises:
responsive to a change in location of the mobile device, handing-off the mobile station.

8. The method of claim 1, wherein handing-off the mobile station further comprises:
responsive to load optimization among components of the wireless network, from a global perspective of all mobile devices and all access points, handing-off the mobile station from the first access point to the second access point.

9. The method of claim 1, wherein handing-off the mobile station further comprises:
responsive to QoS (quality of service) requirements, handing-off the mobile station.

10. The method of claim 1, wherein handing-off the mobile station further comprises:
responsive to global state information concerning components in the wireless network, handing-off the mobile station.

11. The method of claim 1, further comprising: sending the beacon from the first access point to advertise its presence, wherein the beacon comprises multiple BSSIDs.

12. The method of claim 1, wherein the at least one communication parameter comprises at least one of access control, a backoff or retry parameter, a channel selection parameter, quality of service, and transmit power.

13. The method of claim 1, wherein selecting the first access point from the plurality of access points comprises: selecting the first access point from the plurality of access points based on characteristics of communication by the mobile station.

14. The method of claim 1, wherein determining that the mobile station should be handed-off from the first access point to the second access point among the plurality of access points: determining that the mobile station should be handed-off from the first access point to the second access point among the plurality of access points to change an interference pattern of the plurality of access points for optimizing aggregate utilization of a shared spectrum.

15. The method of claim 1, further comprises the uniquely-assigned BSSID from a plurality of persistent, uniquely-assigned BSSIDs to associate with the mobile station based on one or more communication parameters of the uniquely-assigned BSSID selected from the group of: access control parameters, backoff or retry parameters, channel selection parameters, QoS parameters, and transmit power parameters.

16. A computer-implemented method, comprising:
selecting at least one communication parameter to associate with a BSSID (Basic Service Set Identifier);
sending a beacon from an access point to advertise its presence, wherein the beacon comprises the BSSID associated with the at least one communication parameter;
uniquely assigning the BSSID to a mobile station, the BSSID being advertised in the beacon and being independent of an identity of the mobile station for subsequent assignment of a different mobile station;
associating a mobile station with a first access point among a plurality of access points in a wireless network for communication using the uniquely assigned BBSID
handing-off the mobile station by changing associations from the first access point to a second access point among the plurality of access points;
responsive to the hand-off, seamlessly continuing communication with the mobile station at the second access point while using the same uniquely-assigned BBSID without change at the mobile station;
changing at least one communication parameter to associate with the mobile station; and
forcing the mobile station to select a different BSSID associated with the changed communication parameter.

17. A computer implemented method, comprising:
selecting at least one communication parameter to associate with a BSSID;
sending a beacon from a first access point to advertise its presence, wherein the beacon comprises the BSSID associated with the at least one communication parameter;
uniquely assigning the BSSID (Basic Service Set Identifier) to a mobile station, the BSSID being advertised in the beacon and being independent of an identity of the mobile station for subsequent assignment of a different mobile station, wherein the uniquely assigned BSSID is unique to the extent that no range overlap exists between access points from a plurality of access points which use the same uniquely-assigned BSSID;

associating the mobile station with the first access point among the plurality of access points in a wireless network for communication using the uniquely-assigned BSSID;

handing-off the mobile station by changing associations from the first access point to a second access point among the plurality of access points;

responsive to the hand-off, seamlessly continuing communication with the mobile station at the second access point while using the same uniquely-assigned BSSID without change at the mobile station;

responsive to conflict between mobile devices using the same uniquely-assigned BSSID, reassigning at least one of the mobile devices to an updated uniquely-assigned BSSID.

18. At least one non-transitory computer readable medium storing a computer program product that when executed by a processor performs a method in a system coordinator to provide seamless mobility to an end point in a wireless network by controlling soft handoffs of the end point among access points with the use of a persistent, uniquely-assigned BSSID (Basic Service Set Identifier), comprising:

selecting at least one communication parameter to associate with a BSSID;

sending a beacon from a first access point to advertise its presence, wherein the beacon comprises the BSSID associated with the at least one communication parameter;

responsive to the mobile station choosing the BSSID being advertised in the beacon sent from the first access point, selecting to uniquely assign the BSSID to a mobile station;

associating the first access point from the plurality of access points with the mobile station, wherein associating comprises using the uniquely-assigned BSSID with the mobile station persistently and associating is made as selected by the system coordinator, the uniquely assigned BSSID being independent of an identify of mobile station and being eligible for subsequent assignment to a different mobile station as determined by the system coordinator;

determining that the mobile station should be handed-off from the first access point to a second access point among the plurality of access points;

handing-off the mobile station by changing associations of the uniquely-assigned BSSID from the first access point to a second access point, wherein a coordinator database of the system coordinator is updated according to the change, the coordinator database storing a plurality of access point identifiers in association with a plurality of mobile station identifiers, wherein the uniquely-assigned BSSID is persistent due to the mobile station maintaining the uniquely assigned BSSID through hand-offs between access points; and responsive to the hand-off, seamlessly continuing communication with the mobile station at the second access point while using the same uniquely-assigned BSSID without change at the mobile station, such that the mobile station continues communication with the second access point as if communication was still occurring with the first access point.

19. A system coordinator to provide seamless mobility to an end point in a wireless network by controlling soft handoffs of the end point among access points with the use of a persistent, uniquely-assigned BSSID (Basic Service Set Identifier), comprising:

a first module to select at least one communication parameter to associate with a BSSID;

a second module to send a beacon from a first access point to advertise its presence, wherein the beacon comprises the BSSID associated with the at least one communication parameter;

a third module to responsive to the mobile station choosing the BSSID being advertised in the beacon sent from the first access point, select to uniquely assign the BSSID to a mobile station;

a fourth module to associate the first access point from the plurality of access points with the mobile station, wherein associating comprises using the uniquely-assigned BSSID with the mobile station persistently and associating is made as selected by the system coordinator, the uniquely assigned BSSID being independent of an identify of mobile station and being eligible for subsequent assignment to a different mobile station as determined by the system coordinator;

a fifth module to determine that the mobile station should be handed-off from the first access point to a second access point among the plurality of access points;

a sixth module to hand-off the mobile station by changing associations of the uniquely-assigned BSSID from the first access point to a second access point, wherein a coordinator database of the system coordinator is updated according to the change, the coordinator database storing a plurality of access point identifiers in association with a plurality of mobile station identifiers, wherein the uniquely-assigned BSSID is persistent due to the mobile station maintaining the uniquely assigned BSSID through hand-offs between access points; and a seventh module to responsive to the hand-off, seamlessly continue communication with the mobile station at the second access point while using the same uniquely-assigned BSSID without change at the mobile station, such that the mobile station continues communication with the second access point as if communication was still occurring with the first access point.

* * * * *